W. M. WHITMER.
HEADLIGHT.
APPLICATION FILED SEPT. 22, 1920.
1,408,788.
Patented Mar. 7, 1922.
2 SHEETS—SHEET 1.
Fig. 1.
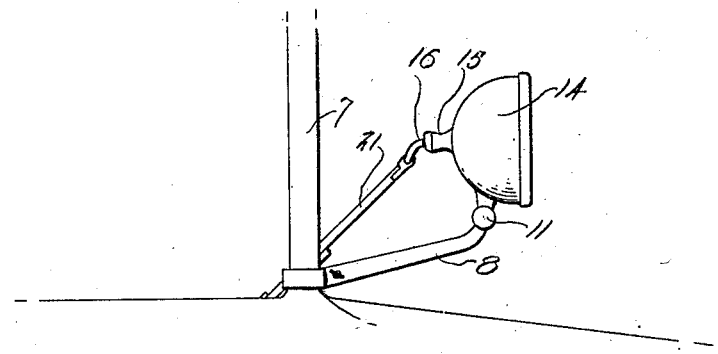
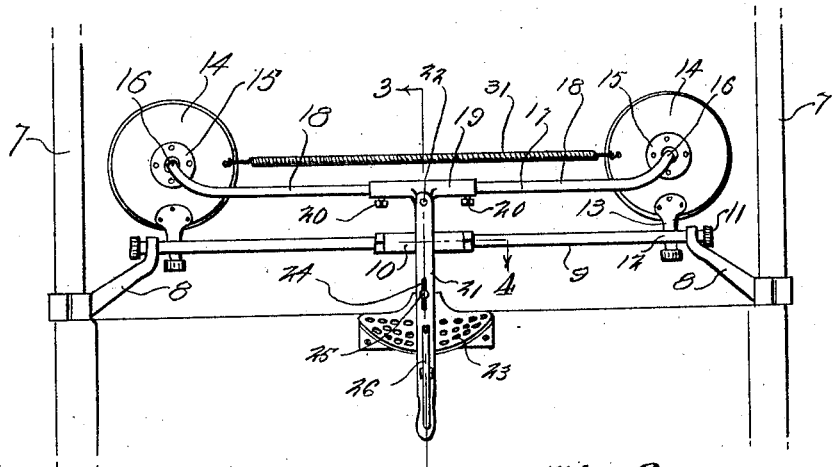
Fig. 2.
WITNESSES.
Weir M. Whitmer, INVENTOR.
BY
Richard B. Owen, ATTORNEY.

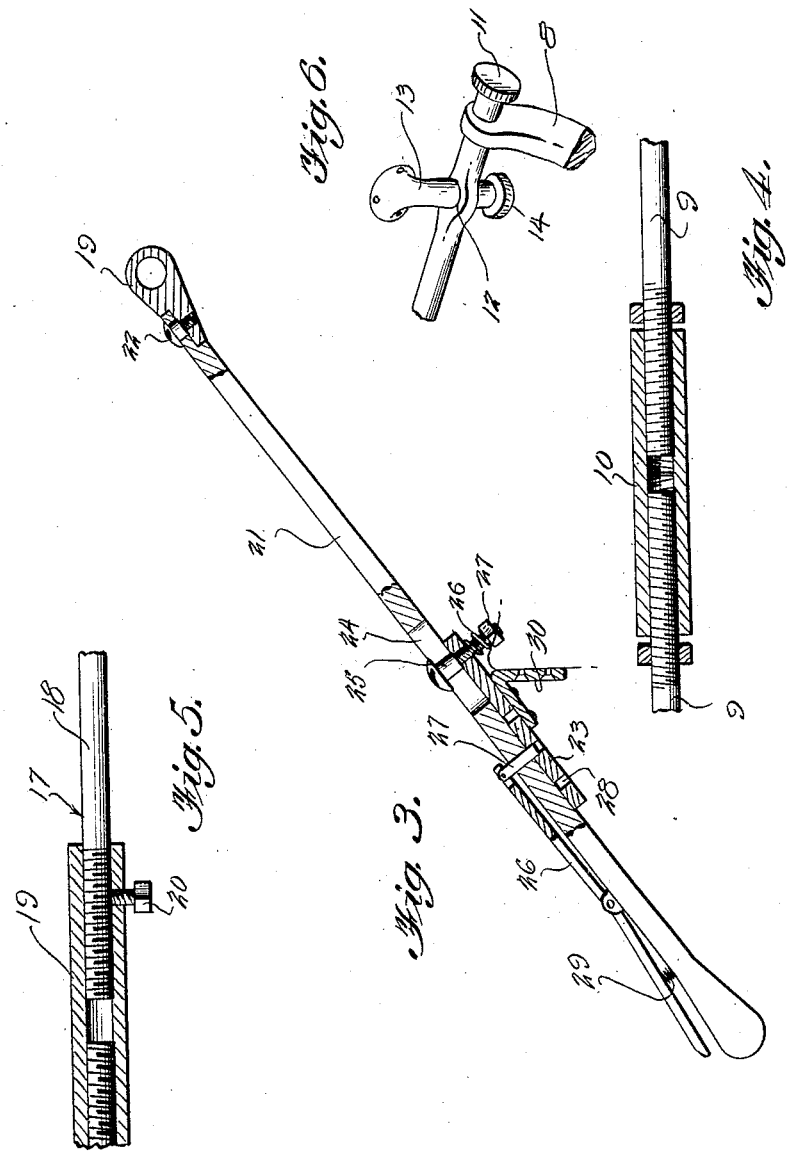

UNITED STATES PATENT OFFICE.

WEIR M. WHITMER, OF WASHTA, IOWA.

HEADLIGHT.

1,408,788. Specification of Letters Patent. Patented Mar. 7, 1922.

Application filed September 22, 1920. Serial No. 412,091.

*To all whom it may concern:*

Be it known that WEIR M. WHITMER, a citizen of the United States, residing at Washta, in the county of Cherokee and State of Iowa, have invented certain new and useful Improvements in Headlights, of which the following is a specification.

This invention relates to new and useful improvements in dirigible headlights, the primary object of the invention being to provide lights of this nature which may be turned or directed by hand, the invention being particularly adapted to motor vehicles whereby the headlights may be directed to shed their light upon the roadway when the vehicle is traversing hills and whereby the lights may be turned from side to side in rounding curves in the roadway and sharp turns.

Another object of the invention is to provide a device of the above nature including means whereby the light may be securely retained in any desired adjusted position.

Another object of the invention is to provide a device of the above nature which is strong, durable, inexpensive to manufacture and which is efficient in practice.

Other objects and advantages of the invention will become apparent during the course of the following description.

In the accompanying drawings forming a part of the application and wherein like numerals are employed to designate like parts throughout the several views—

Figure 1 is a side elevation of the invention applied to an automobile.

Figure 2 is a rear view of the invention.

Figure 3 is an enlarged fragmentary sectional view taken on the line 3—3 of Figure 2.

Figure 4 is an enlarged fragmentary section taken on the line 4—4 of Figure 2.

Figure 5 is an enlarged longitudinal section through one end of the operating lever and Figure 6 is an enlarged fragmentary perspective view of one end of the supporting member for the lamp housings.

In the accompanying drawings wherein for the purpose of illustration is shown the preferred embodiment of the invention, the numeral 7 designates the side rails of an automobile windshield to each of which is clamped a supporting member or bracket 8. These members 8 project forwardly of the windshield and project toward each other to support a rotatable horizontal member 9 which forms a part of the lamp supporting means. This rod 9 extends transversely of the automobile and comprises a pair of sections joined by a turn buckle 10. The rod 9 is therefore rendered longitudinally adjustable so that the device may be associated with automobiles of varying widths. The outer end of each of the rod sections extends through the apertured end of its respective supporting bracket 8, a nut 11 being threaded upon the outer end of each rod to prevent accidental displacement thereof from the supporting brackets. An eyelet 12 is provided in each section of the rod 9 adjacent its respective supporting bracket 8 whereby a lamp post 13 may be rotatably mounted in each eyelet. A nut 14 is threaded upon the lower end of each lamp post to prevent accidental displacement of the same from its respective eyelet. Lamp housings 14 are secured to the lamp post in any suitable manner and it will therefore be seen that these housings are rotatably supported by the rod section 9.

In order that the lamp housings may be turned, or directed simultaneously, each housing is equipped with a ball socket 15 in which are loosely mounted the ball shaped ends 16 of a controlling rod 17. This controlling rod is also arranged transversely of the automobile in front of the windshield and this is made up of a pair of rod sections 18 and a connecting member 19 in the form of a sleeve. The inner end of the rod sections 18 are threaded into opposite ends of the sleeve member and retained therein by means of set screws 20. By the provision of this construction and adjustment of the controlling rod, it will be seen that the device is readily adaptable to windshields of varying widths.

For operating the controlling rod, an operating lever 21 is pivotally connected to the sleeve member 19 at the forward end of the lever and is pivoted and slidably associated with a retaining plate 23 secured to the dash of the automobile. The intermediate portion of the operating lever is provided with an elongated longitudinally extending slot 24 through which extends the shank of a bolt 25. This shank also extends through an opening in the retaining plate 23 and a coiled spring 26 encircles the shank of the bolt to bear against the underside of the retaining plate 23 and upon a nut 27 threaded upon the bolt. Consequently the coiled spring frictionally retains the operating lever 21 against the retaining plate 23, but the strength of the spring is such that the operating lever may be moved longitudinally the length of its slot 24 and swing with the bolt 25 as a center.

Pivoted to the upper face of the handle end of the operating lever is a pawl 26, the free end of which is provided with a pin 27 adapted to normally extend through an opening in the operating lever and at times through any of a plurality of apertures 28 provided in the retaining plate 23. A coiled spring 29 is secured between the handle end of the operating lever and the handle end of the pawl 26 so that the pin 27 carried by the pawl is normally urged through the opening in the operating lever. The retaining plate is fastened to the dash of the automobile by an angle cleat 30 in a manner to hold this plate stationary.

From the foregoing description, it will be seen that the lamp housing 14 may be turned to right or left by swinging the operating lever 21 to cause the control rod 17 to move transversely of the automobile it being seen that the lamp housings 14 are connected by a coiled spring 31 whereby they are caused to move simultaneously. As the operating lever is swung to move the lamp housing it is also caused to slide over the retaining plate thereby causing the bolt 25 to travel in the elongated slot 24. If it should be desired to retain the lamp housing in the adjusted position, pressure upon the pawl 26 is released whereby the spring 29 causes the pin carried by the pawl to pass into one of the openings in the retaining plate.

In the event that the automobile to which the invention is applied is climbing a hill and it is desired to direct the light from the lamp housing down upon the roadway instead of parallel with the surface of the road, the handle of the operating lever is grasped in a manner whereby the pawl 26 may be actuated to disengage from the opening 28 with which it is associated. The operating lever is then moved forwardly to cause the control rod 17 to move, turn, or rotate, causing light to be thrown upon the road.

The foregoing description and the accompanying drawings have reference to the preferred or approved embodiment of my invention. It is to be understood however that such changes may be made in construction and arrangement of parts, materials, dimensions, etc. as may prove expedient and fall within the scope of the appended claims.

Having thus fully described my invention what I claim as new and desire to secure by Letters Patent is:—

A device of the class described comprising a supporting member pivoted for oscillation about a horizontal axis, lamp housings mounted for oscillation on vertical axes upon said member, a control rod connecting the lamp housings, a stationary plate provided with a plurality of apertures, a lever pivotally connected at one end to the control rod and connected between its ends for pivotal and sliding association with said plate, and said lever having means for cooperation with the apertures in said plate to retain the lever in adjusted positions.

In testimony whereof I affix my signature in presence of two witnesses.

WEIR M. WHITMER.

Witnesses:
O. D. WHITMER,
RAY HAMILTON.